Dec. 21, 1965 A. B. WYNNE 3,224,701
ROLL LOCK-UP
Filed Aug. 11, 1964
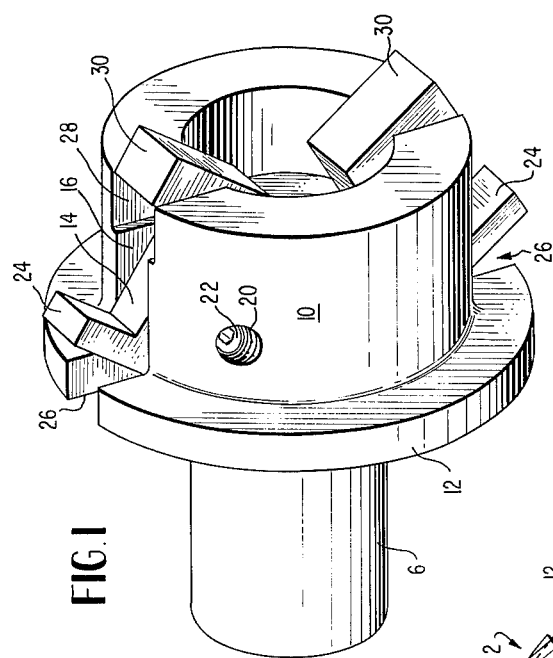
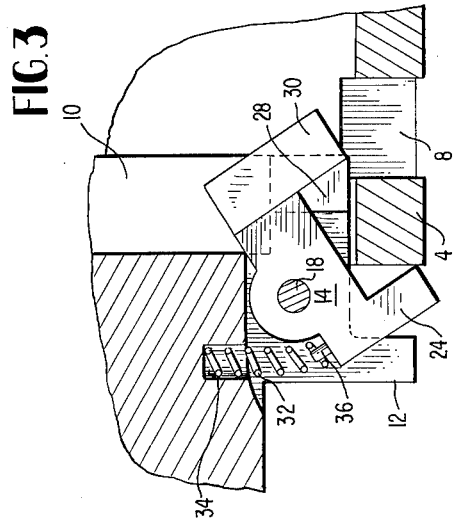
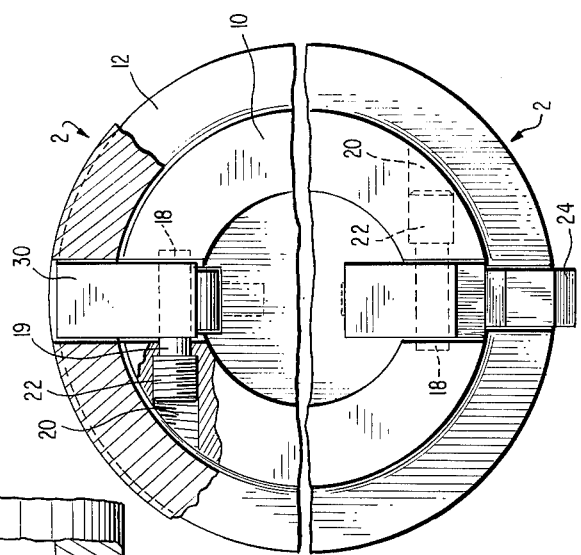
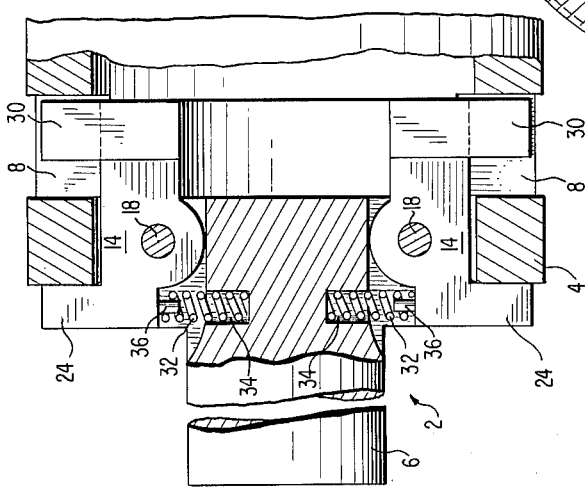
INVENTOR.
ARLIE B. WYNNE
BY James H. Littlepage
ATTORNEY

United States Patent Office 3,224,701
Patented Dec. 21, 1965

3,224,701
ROLL LOCK-UP
Arlie B. Wynne, Rte. 3, Box 336, Saraland, Ala.
Filed Aug. 11, 1964, Ser. No. 388,840
5 Claims. (Cl. 242—68.1)

This invention relates to a mechanism for supporting a hollow core, such as the core of a roll of newsprint, at its ends in a suitable mechanism, such as a printing press. A device such as this is known in the printing trade as a roll lock-up.

The primary object of this invention is to provide a roll lock-up which will engage into the end of a hollow core and which, upon such engagement, will interlock with the core so as to prevent rotation of the core with respect to the roll lock-up. More particularly, it is intended to provide a roll lock-up having a cylindrical head which engages into the end of a hollow core, and normally retracted lugs on the head which are actuated by the endwise engagement of the head into the core so as to swing outwardly and engage into apertures in the core.

These and other objects will be apparent from the following specification and drawing, in which:

FIG. 1 is a perspective view of the roll lock-up disengaged from a roll core;

FIG. 2A is a fragmentary end view of the lower half of the roll lock-up in disengaged condition;

FIG. 2B is a fragmentary end view, partly in section, of the upper half of the roll lock-up with a core engaged thereon;

FIG. 3 is a fragmentary cross section showing the action of one of the levers and the lug thereon during partial engagement of a core onto the roll lock-up; and, FIG. 4 is a vertical cross-section through the roll lock-up with a core engaged thereon.

Referring now to the drawing, in which like reference numerals denote similar elements, the roll lock-up 2 is designed to engage within the end of a hollow cylindrical core 4, such as the core of a roll of newsprint. Roll lock-up 2 has a shaft 6 for supporting the roll in a printing press, not shown. The length and diameter of shaft 6 will depend upon the nature of the particular press with which the invention is used. Core 4 is conventional except that it is provided with a pair of apertures 8 through diametrically opposite sides, the apertures preferably being oblong.

Roll lock-up 2 has an enlarged hollow cylindrical head 10 rigid with shaft 6, and a radially outward flange 12 at its inner end. In head 10 are pivoted levers 14 which rock in axially extending slots 16 through diametrically opposite sides of the wall of head 10. Levers 14 rock about pintles 18 which fit in bores 19 extending inwardly from opposite sides of head 10 so as to intercept slots 16. The outer ends 20 of bores 19 are enlarged and threaded to receive enlarged threaded heads 22 on pintles 18.

On their rear ends, levers 14 have arms 24 which are accommodated in slots 26 through diametrically opposite sides of flange 12. The slots 16 in head 10 have enlargements 28 at their forward ends for accommodating oblong lugs 30 which are rigid with and somewhat larger than levers 14. Levers 14 are normally rocked so as to retract lugs 30 within the peripheral confines of head 10 by means of compression springs 32 whose radially inner ends engage in radial bores 34 at the inner ends of slots 26, and whose radially outer ends engage around pins 36 on the inner sides of levers 14.

In operation, levers 14 are normally rocked by springs 32 to the position shown in FIGS. 1, 2A and 3 so that lugs 30 do not project radially outward beyond the periphery of head 10. However, when core 4 slides over the free end of head 10, the end of the core engages lever arms 24 (FIG. 3) and rocks levers 14 back against the forces of springs 32 so as to swing lugs 30 outwardly into apertures 8 in the core 4 so that the lugs block the core rotation relative to roll lock-up 2. Flange 12 limits the axial movement of the core over the head. When the core is removed by endwise sliding relative to the roll lock-up, springs 32 rock levers 14 back to their FIG. 1 position in readiness to receive another core.

The invention is not limited to the details of the structure illustrated and described herein, but is intended to cover all modifications, substitutions and equivalents within the scope of the following claims.

I claim:

1. A roll lock-up, comprising a cylindrical head having front and rear ends, said cylindrical head being adapted to engage endwise into one end of a hollow cylindrical core having an aperture adjacent said end, said head having an axially extending slot extending inwardly from the periphery thereof, a lever disposed in said slot, said lever having front and rear ends respectively disposed towards the front and rear ends of said head, an outwardly extending arm on the rear end of said lever, an outwardly extending lug on the front end of said lever, said lever, lug and arm constituting a generally U-shaped integral member, a pivot mounting said lever in said slot for rocking movement between a first position in which said arm extends outwardly and forwardly and said lug is retracted within the periphery of the head and a second position in which both the arm and the lug extend radially outward of said head, and spring means engaging between said head and said lever for biasing the latter to said first position, whereby when said core engages over said head, the end of said core engages the arm and rocks the lever so as to extend said lug into said aperture.

2. The combination claimed in claim 1, and means extending outwardly from the rear end of said head for limiting axial movement of said core over said head.

3. A roll lock-up, comprising a cylindrical head adapted to engage endwise into one end of a hollow cylindrical core having aperture means therein, means on one end of said head for rotatably mounting the same on a printing press, means on said head for limiting relative endwise movement of the core over the head, normally retracted lug means on said head, said lug means being radially extensible for engaging in the aperture means in said core, means rigid with said lug means and engageable by the end of the core for moving said lug means from retracted to extended position, and means for normally biasing said lug means to retracted position.

4. A roll lock-up, comprising a hollow cylindrical head having front and rear ends, said head being adapted to engage endwise into one end of a hollow cylindrical core having apertures in diametrically opposite sides thereof, a radially outward extending flange on the rear end of said head for engaging against said core, means on the rear end of the head for supporting the same in a printing press, a pair of diametrically opposite slots each extending through the side wall of said head and said flange, a pair of levers respectively disposed in said slots and having front and rear ends respectively disposed towards the front and rear ends of said head, said levers having outward extending arms on the rear ends thereof and outwardly extending lugs on the front ends thereof, means pivotally mounting said levers in said slots for rocking movement between a first position in which said arms extend forwardly and outwardly of the juncture of said head and flange in position to be engaged by the end of the core as the latter is engaged axially endwise over the head and said lugs are retracted within the peripheral confines of said head, and a second position in which said arms are accommodated in those portions of the slots which extend through the flanges and said lugs extend radially outward of said head in position to engage in the apertures in the core, and spring means engaged between said head and said levers for normally biasing said levers to said second position.

5. The combination claimed in claim 4, said slots having diametrically enlarged forward ends terminating at the rear end of said head, said lugs closely engaging in said enlarged forward ends, whereby the torsional loads transmitted between said core and said head are imposed upon the engaging surfaces of said lugs and slot enlargements.

References Cited by the Examiner
UNITED STATES PATENTS

| | | | |
|---|---|---|---|
| 894,206 | 7/1908 | Husby | 242—68.4 |
| 1,001,861 | 8/1911 | Kennedy | 242—68.1 |
| 1,037,988 | 9/1912 | Richards | 242—68.1 |

MERVIN STEIN, *Primary Examiner.*